United States Patent [19]

Moulton et al.

[11] Patent Number: 5,765,849
[45] Date of Patent: Jun. 16, 1998

[54] FIFTH WHEEL BRACKET

[75] Inventors: Howard Thomas Moulton, Birmingham; Jeff Marcus Terry, Homewood, both of Ala.

[73] Assignee: Fontaine Fifth Wheel Co., Birmingham, Ala.

[21] Appl. No.: 639,047

[22] Filed: Apr. 24, 1996

[51] Int. Cl.⁶ .................................................. B62D 53/08
[52] U.S. Cl. .......................................... 280/433; 280/441
[58] Field of Search ................................ 280/433, 437, 280/438.1, 441, 489; 267/141.2, 276, 293

[56] References Cited

U.S. PATENT DOCUMENTS

| | | | |
|---|---|---|---|
| 1,977,896 | 10/1934 | Saurer | 267/293 |
| 2,196,537 | 4/1940 | Sherman | 280/441 |
| 2,809,851 | 10/1957 | Beck | 280/438.1 |
| 3,278,198 | 10/1966 | Tantlinger | 280/433 |
| 3,598,427 | 8/1971 | Lavery | 280/433 |
| 5,344,173 | 9/1994 | Beeler et al. | 280/438.1 |
| 5,368,324 | 11/1994 | Kaim | 280/438.1 |
| 5,449,191 | 9/1995 | Cattau | 280/438.1 |

FOREIGN PATENT DOCUMENTS

| | | | |
|---|---|---|---|
| 111071 | 8/1940 | Australia | 280/433 |
| 51-113 | 5/1982 | European Pat. Off. | 280/438.1 |

*Primary Examiner*—Dean Kramer
*Attorney, Agent, or Firm*—Rudnick & Wolfe

[57] ABSTRACT

The present invention relates to a bracket assembly for connecting a trailer to a truck. The bracket assembly includes a base, upright support assemblies, a top plate carried on the support assemblies, a unique reinforced bushing for distributing shearing forces through the assembly is positioned in the support assemblies with the top plate, upright support assemblies and bushing interconnected by bracket pins.

28 Claims, 5 Drawing Sheets

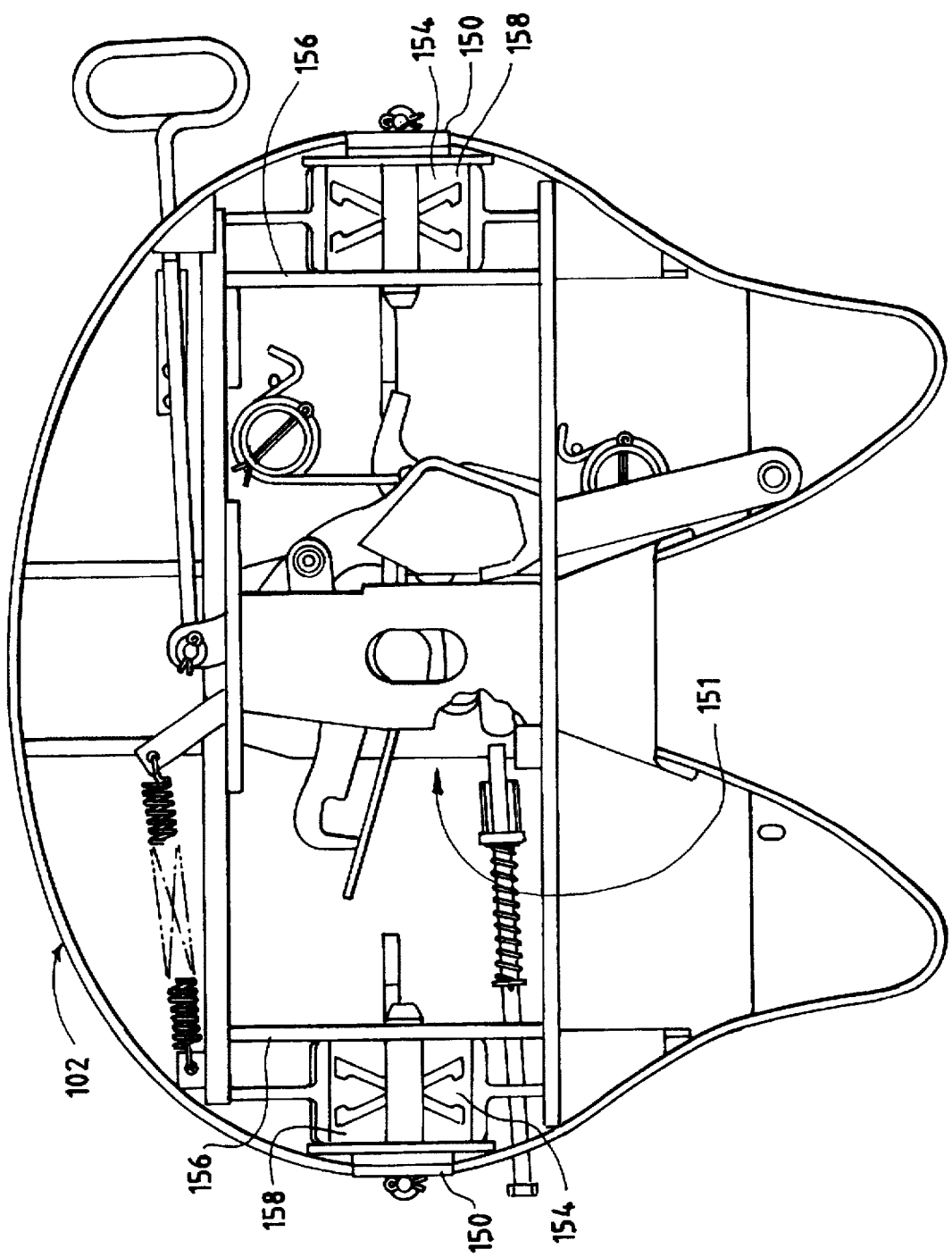

FIFTH WHEEL BRACKET

FIELD OF THE INVENTION

The present invention relates to a bracket assembly for connecting a tractor or truck with a trailer. More particularly, the present invention is directed to a new and improved bracket assembly designed to secure the top plate or fifth wheel to a truck frame and permit connection of the trailer to the truck.

BACKGROUND OF THE INVENTION

In the art to which this invention applies, it has generally been the practice to provide an apparatus for attaching a trailer of a semi trailer-type rig to a truck to insure a pivotable, easily releasable yet sturdy and strong connection. Traditionally, the connection between the truck and the trailer has been made by pivotally securing a downwardly depending king pin carried on the front of a trailer to a lockable latching mechanism commonly called a "fifth wheel." The fifth wheel is secured to the rearward frame or chassis of the truck. More particularly, a base plate is secured to the rearward chassis or frame of the truck and generally disposed in an orientation parallel to the road. A pair of support members are provided and positioned adjacent to the edges of the base plate and secured thereto. Each support member generally includes a means for pivotally securing a top plate thereto such as an opening for receiving attachment pins. A top plate with an inwardly and centrally positioned throat for retaining and locking the downwardly depending king pin of a trailer is positioned to be carried by the support members. The top plate generally includes a latching mechanism for releasably retaining and locking the king pin in the throat. The top plate is generally pivotably connected to the support bracket by inserting a pin through a portion of the side of the top plate and the support member. The pins are usually inserted along an axis transversely of the truck and road. This configuration permits the top plate to be rotatably secured to the truck.

The top plate of some prior art fifth wheels may include a skirt that depends downwardly from its outer edge. When the top plate is placed over the support brackets, a portion of the skirt is positioned parallel and outwardly adjacent to each of the support hatchets. The top plate may also include a downwardly depending flange parallel to and spaced inwardly from a portion of the depending skirt of the top plate so as to form a generally U-shaped inverted channel that fits over the support brackets. The downwardly depending flange and the downwardly depending skirt also have openings therethrough that align with and are coaxial with openings in the support members. A pin is inserted through the depending skirt portion into each of the support brackets and the downwardly depending flange connecting the top plate to the support brackets. The top plate now secured to the truck is then capable of receiving the king pin from the trailer and securing it to the truck.

In these prior art arrangements, significant loads are delivered to the bracket and pin assembly as a result of the tendency of the top plate to move upwardly away from the support brackets due, for example, to bouncing and side to side movement of the trailer. In addition, overturning loads are produced when the truck is turned, even at low speeds. With overturning, there is a tendency for the top plate to lift up at one of the support bracket locations. This tendency for the top plate to lift up and away from the support brackets produces shearing forces on the pins. Shearing forces may cause deformation of the pin considerably weakening the connection between the truck and trailer, and may also damage the fifth wheel ultimately resulting in down time of the truck for repairs.

In view of the above, there remains a need for a bracket assembly that is inexpensive, strong, and capable of withstanding the loads created by movement of the top plate relative to the bracket assembly. In addition, there is a need for a bracket assembly that assists in distributing the shearing forces incumbent in connecting a truck to a trailer.

SUMMARY OF THE INVENTION

The purpose and advantages of the invention will be set forth in and apparent from the description and drawings that follow, as well as will be learned by practice of the invention. Additional advantages of the invention will be realized and attained by the elements of the apparatus particularly pointed out in the appended claims.

To achieve these and other advantages and in accordance with the purpose of the invention, as embodied and broadly described herein, the bracket of the present invention includes a bracket assembly for connecting a fifth wheel to a truck. The assembly includes a base adapted to be secured on the rearward end of a truck. A pair of spaced apart retainer assemblies are connected to the base and disposed adjacent opposite edges of the base. The retainer assemblies include spaced apart support plates disposed substantially perpendicular to the base. One of the support plates includes a pin securing opening. The bracket assembly is also provided with a cylindrical tube portion coaxial with the pin securing opening and carried on the support plates. A radially reinforced bushing is seated in the cylindrical tube portion. The reinforced bushing includes a bore therethrough coaxial with the pin securing opening.

In an additional embodiment of the present invention, a top plate is provided adapted to receive and secure the king pin of a trailer. The top plate is disposed over the pair of retainer assemblies and includes a peripheral downwardly depending skirt and a saddle formed inwardly from said skirt portion. The saddle of the skirt portion is adapted to engage the cylindrical tube portion of the retainer assemblies. A portion of opposite ends of the skirt are disposed parallel to and outwardly from the support plates and include an aperture therethrough. A pair of bracket pins are provided each extending through the aperture in the skirt, the opening in the support plate and through the bore of the reinforced bushing respectively. In addition, a pair of locking pins are provided for preventing the removal of the pair of bracket pins.

It is to be understood that both the foregoing general description and the following detailed description are exemplary and provided for purposes of explanation only, and are not restrictive of the invention, as claimed.

BRIEF DESCRIPTION OF THE DRAWINGS

The accompanying drawings, which are incorporated and constitute a part of this specification, illustrate the preferred embodiment of the invention, and together with the description, serve to explain the principles of the invention.

FIG. 8 is a plan view of the underside of the top plate of FIG. 1 of the present invention.

DETAILED DESCRIPTION OF THE PREFERRED EMBODIMENT

Figure 1:
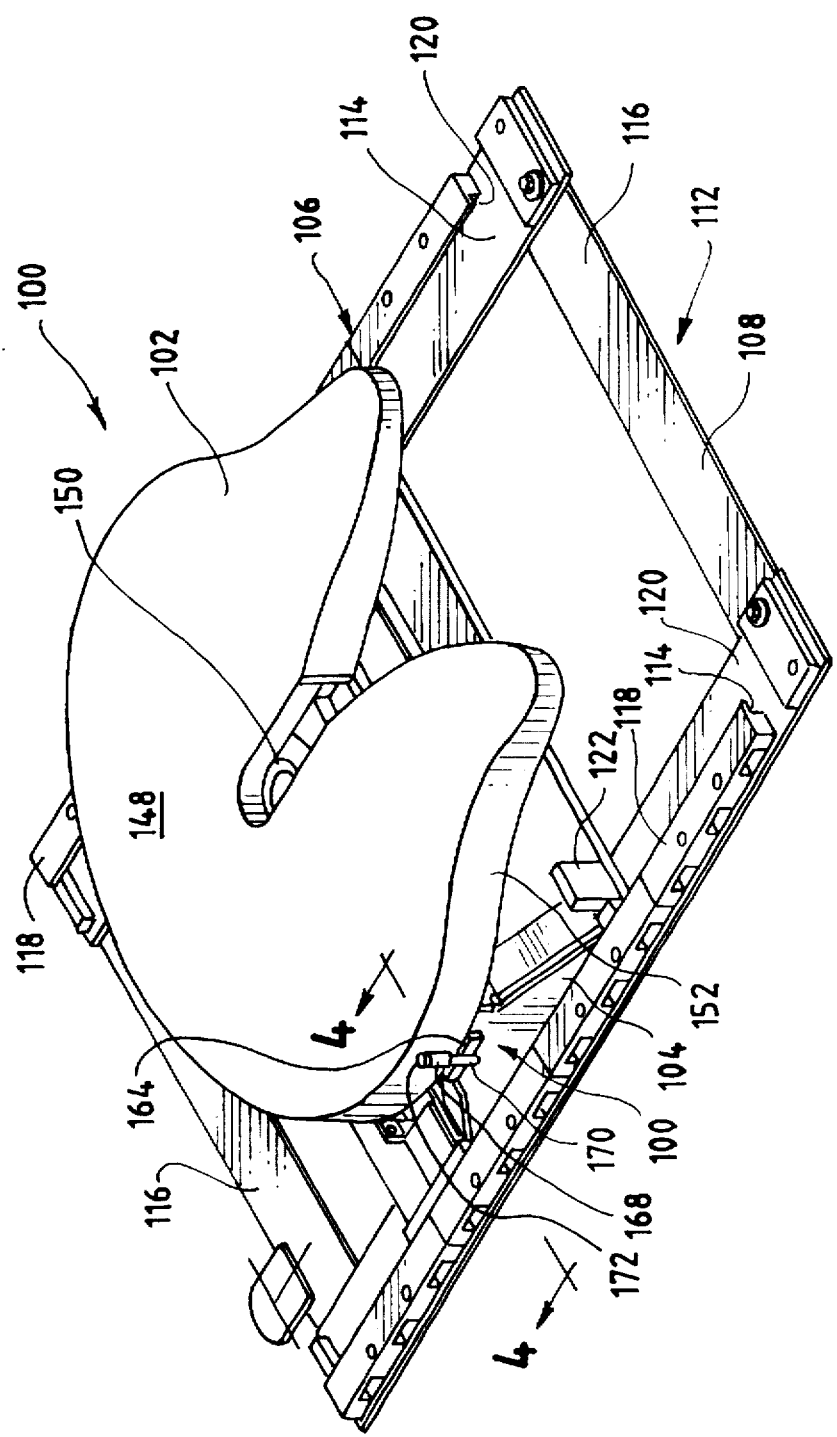
FIG. 1 is an isometric view of the present invention.

Reference will now be made in detail to the present preferred embodiment of the bracket of the present invention for attaching a trailer to the tractor examples of which are illustrated in accompanying drawings. Wherever possible, the same reference characters will be used throughout the drawings to refer to the same or like parts.

An exemplary embodiment of the preferred bracket assembly of the present invention is shown in FIG. 1 and designated generally by reference character 100. FIG. 1 shows the top plate 102, commonly referred to as a fifth wheel, the lower bracket assembly 104, and the base 106.

Figure 3:
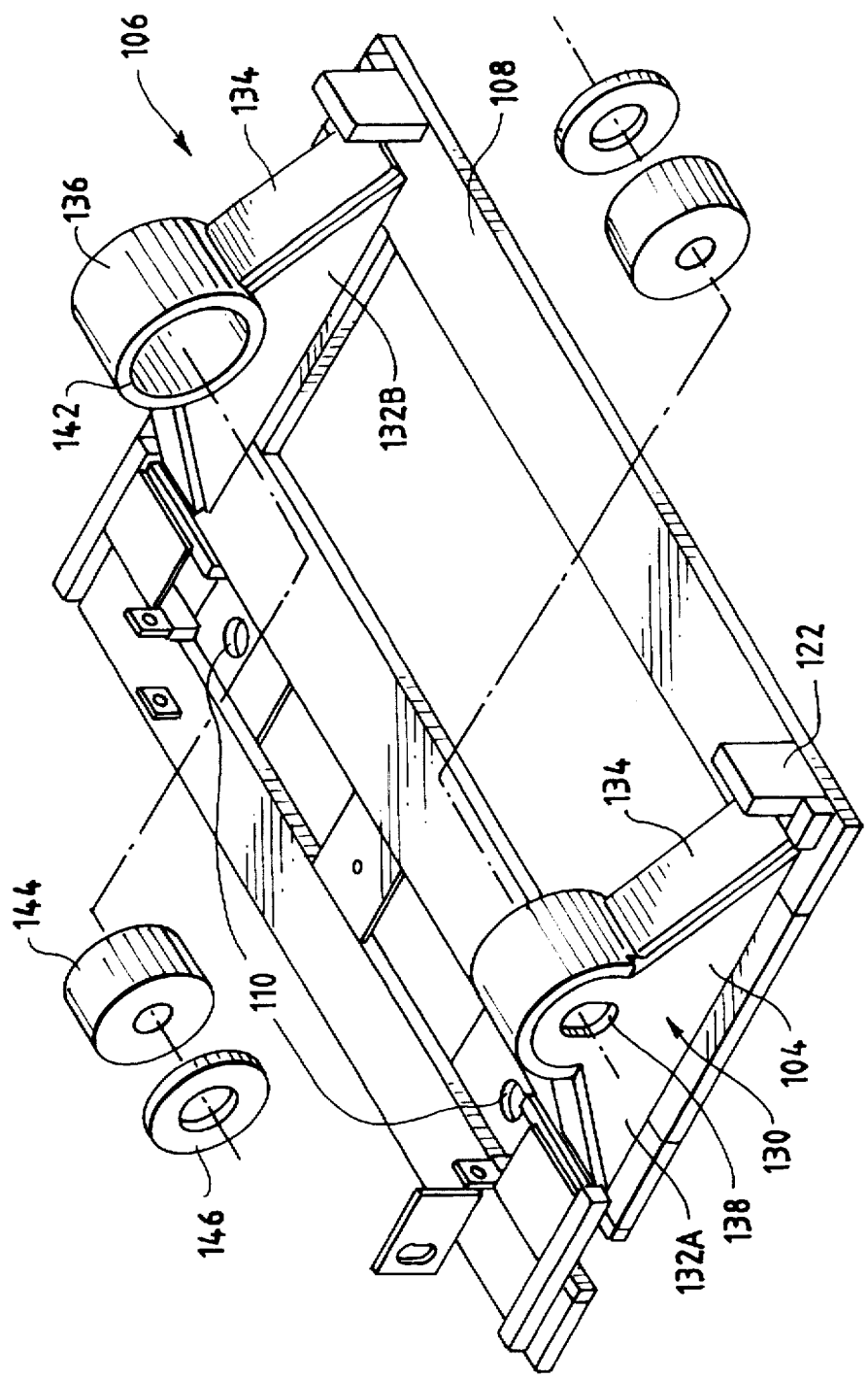
FIG. 3 is an isometric view of the present invention with the top plate removed.

Referring now to FIG. 3, the base 106 includes a generally rectangular base plate 108. The base plate 108 includes openings 110 for receiving a bolt for securing the base plate to the main chassis or frame of a truck (not shown). Turning now to FIG. 1, the base plate 108 may be carried on a frame 112 having elongated spaced apart parallel panels 114 and spaced apart cross panels 116 connected across the ends of the elongated panels 114 forming a generally box-shaped frame 112. Rails 118 are disposed along the outer edge of the elongated parallel panels 114. The rails 118 are secured preferably be screws or bolts through the frame 112 to the truck frame. The rails 118 form channels 120 which receive the lateral edges of base plate 108 and guide the base plate 108 to selected positions along the truck frame. Disposed on the rearward end of the base plate 108 are generally upstanding rocker limit blocks 122 designed to limit the rocking motion of the top plate 102 when secured to the retainer assembly 104.

Figure 2:
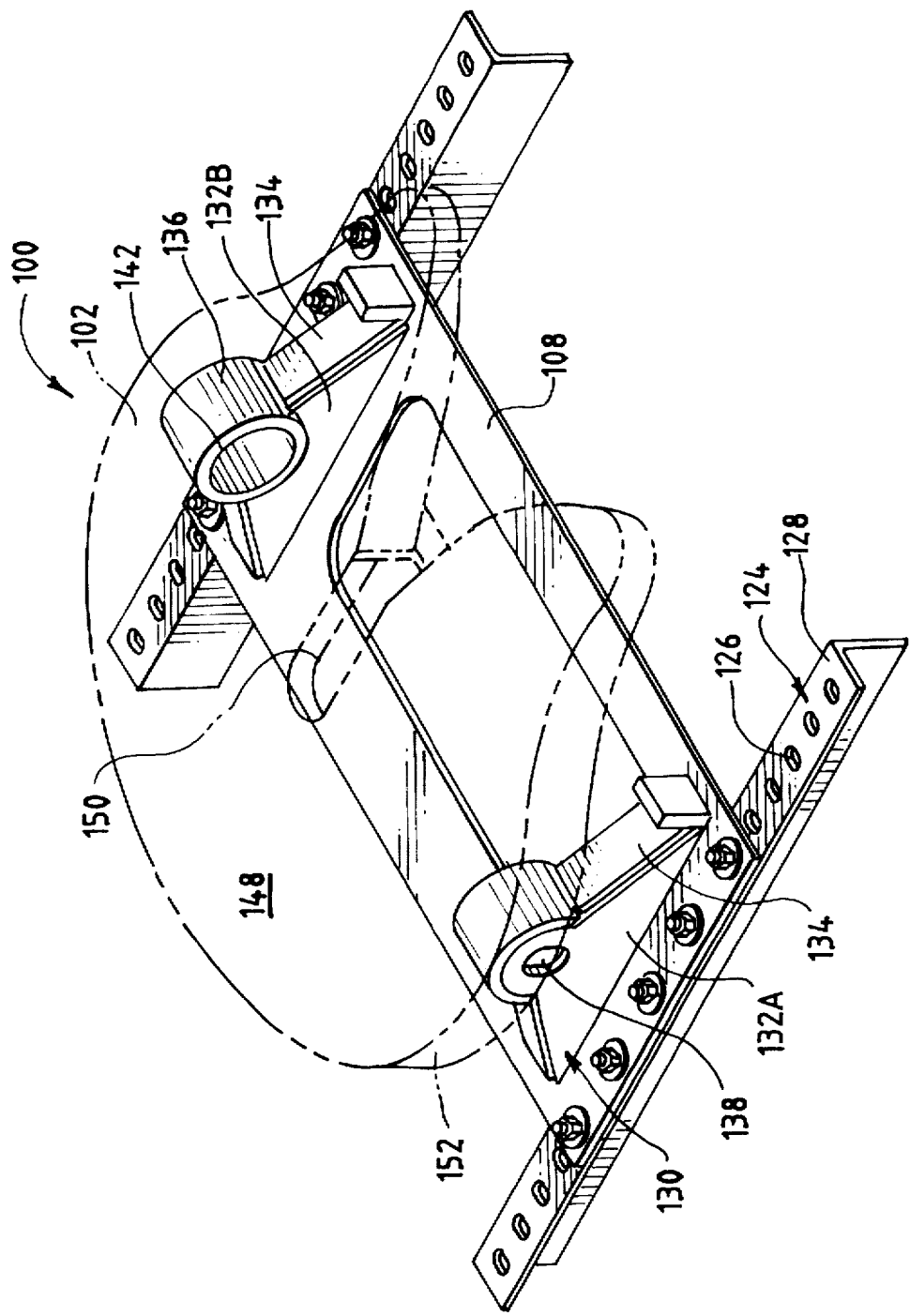
FIG. 2 is an isometric view of an alternative embodiment of the present invention with the top plate of the present invention shown in phantom lines.

Alternatively, as shown in FIG. 2, the base plate 108 may be secured to a pair of elongated angle irons 124 having a series of openings 126 disposed along the horizontally disposed flange portions 128. The angle irons 124 are attached to the main chassis or frame of the truck preferably with nuts and bolts. The base plate 108 may be secured to selected positions along the truck frame by moving the base plate to a desired position on the angle iron and securing the base plate 108 to the angle iron through holes 126.

Referring again to FIG. 3, the lower bracket assembly 104 is carried on the base plate 108 and generally includes a pair of spaced apart upright retainer assemblies 130 which are positioned toward the lateral edges of the base plate 108. Each retainer assembly 130 includes a pair of upstanding support plates 132A and 132B spaced apart from each other and a generally triangular brace 134 connected to the support plates 132 forming a generally hollow cylindrical tube 136 supported by the two upright brackets. Communicating with the generally hollow cylindrical tube 136 of each retainer assembly is an opening 138 of a predetermined diameter formed through the support plate 132A closest to the lateral edge of the base plate 108. The diameter of the opening 138 through the support plate 132A is generally sized to accommodate a bracket pin 140 of the type illustrated in FIG. 6 and permit limited movement of the pin in the opening. To permit limited vertical movement of a bracket pin 140, the opening 138 may be configured as a vertically oriented oval.

Spaced inwardly from the opening 138, the tube 136 of considerably larger diameter extends inwardly and terminates at an inwardly formed rim 142. The opening 138 and the central axis of tube 136 are coaxial. The retainer assemblies 130 may be integrally cast or welded together. It is preferred that the retainer assemblies 130 be constructed of fabricated or cast steel. The retainer assembly 130 is secured to the lateral edges of the base plate, preferably by welding.

Figure 4:
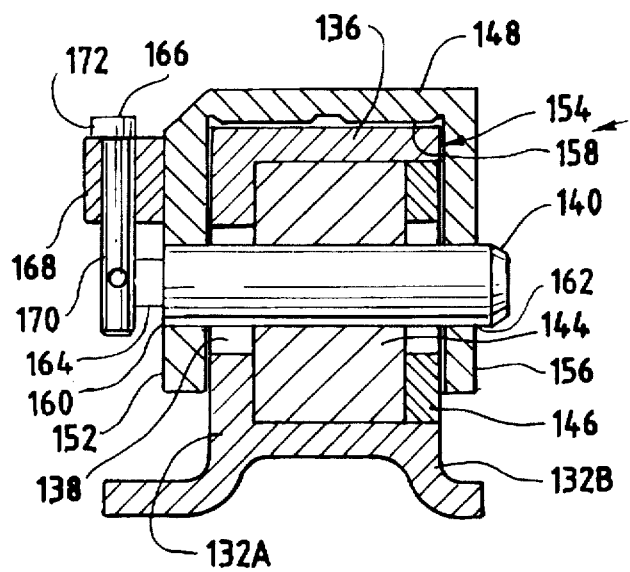
FIG. 4 is a cross-sectional view of the bracket assembly of the present invention of FIG. 1 taken along lines 4—4.
Figure 5:
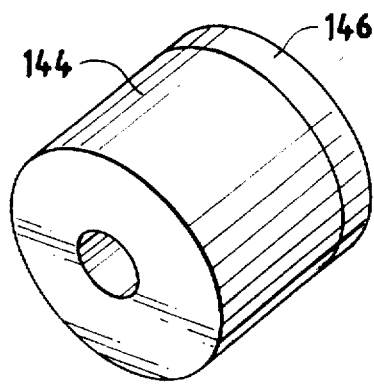
FIG. 5 is an isometric view of the reinforced bushing used in the bracket assembly of the present invention.

The final element of the retainer assembly includes a reinforced rubber bushing 144, preferably formed integrally with a steel washer of substantially identical outside diameter, as illustrated in FIG. 5. The diameter of the bore through the rubber bushing is generally sized to receive a bracket pin 140 preferably of the type illustrated in FIG. 6. The pin should preferably fit snugly within the bore through the bushing 144. The opening in the steel washer that reinforces the rubber bushing should preferably be slightly larger in diameter than the bore through the bushing. This arrangement permits the rubber bushing to dampen vibrations transmitted through the pin 140 and also permit the steel washer to distribute the shearing force. The rubber bushing 144 is sized and shaped to fit snugly into the hollow cylindrical tube 136 of the retainer assembly 130. The rubber bushing 144 is sized preferably so that it is maintained in the tube 136 by an interference fit. The rubber bushing 144 is comprised preferably of a relatively hard rubber or other elastomeric. Alternatively, as shown in FIGS. 3 and 4, the rubber bushing may be reinforced with a steel washer 146, of the substantially same outer diameter that is positioned adjacent the bushing 144 in the tube 130. As illustrated in FIG. 4, the steel washer adjacent the bushing provides additional support and strength to the assembly 100 by distributing the shearing force to which the bracket pin 140 is subjected. The effect is to change the forces acting on the pin from single shear to double shear. In addition, the reinforced bushing 144 may act to reduce or dampen some of the vibration created in the bracket assembly during movement of the truck and trailer.

The top plate 102, as illustrated in FIG. 1, also referred to as the fifth wheel, includes a large flat plate 148 with a gradually narrowing throat 150 formed in the center. A skirt 152 depends downwardly from the outer edges of the top flat plate 150. The skirt 152 is preferably integrally formed with the flat plate. The center of the underside of the flat plate 150 includes a latching mechanism 151 (shown generally in FIG. 8) for securing the king pin of a trailer to the top plate 102. A variety of configurations for the latching mechanism are available and well known in the art. Latching mechanisms of this type generally include a jaw which secures the king pin in the throat of the top plate and a wedge for locking the jaw in place.

Laterally adjacent the latching mechanism, the underside of the flat plate includes a saddle area 154 formed along opposite sides of the top plate 102 as illustrated in FIG. 8. The saddle 154 is formed by a portion of the depending skirt 152, the flat plate 148, and a flange 156 downwardly depending from the underside of the flat plate 148 and inwardly spaced from the skirt portion 152. The saddle 154 may include a generally arcuate saddle bearing surface 158 that is sized to accommodate and engage the hollow cylindrical tube 136 of the retainer assemblies 130. The depending skirt portion 152 includes an opening 160 coaxial with a similarly sized opening 162 through the inwardly spaced depending flange 156. The similarly sized openings 160, 162, are sized to receive the bracket pin 140 when the top plate is secured to the lower bracket assembly.

Figure 6B:
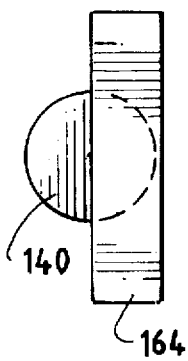
FIG. 6a–c is a side, bottom and top view of the bracket pin of the present invention.
Figure 6A:
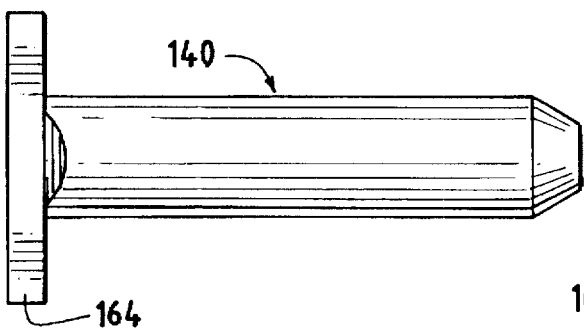
Figure 6C:
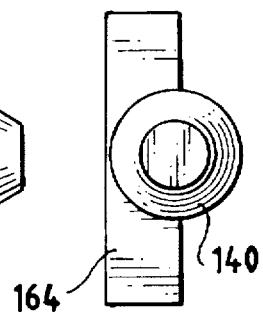

As shown in FIG. 6, an elongated cylindrical bracket pin 140 is provided for securing the top plate to the retainer assemblies. The bracket pin 140 is sized to extend from the opening 160 in the depending skirt portion through the opening 162 in the inwardly spaced depending flange portion 156. The bracket pin 140 includes a rectangular stop 164 connected to the rearward end of the pin 140. The stop 164 is preferably welded to the rearward end of the pin and is longer than the diameter of the opening 160 in the depending skirt portion.

Figure 7A:
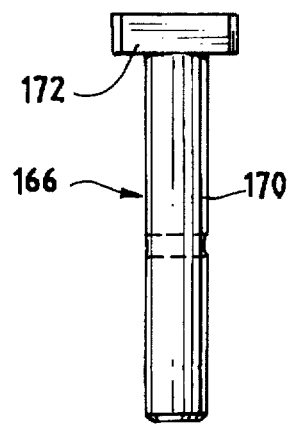
FIG. 7a–b is a side and top view of the retainer pin of the present invention.
Figure 7B:
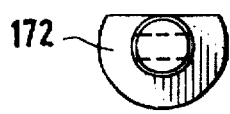

A retainer pin assembly 166 illustrated in FIGS. 1 and 4 includes a generally hollow cylindrical tube 168 disposed in a vertical orientation and which is shown in FIG. 1 welded to the outer surface of the depending skirt portion 152 above the opening 160 through the skirt portion. A retainer pin 170 shown in detail in FIG. 7 is provided to be inserted through the vertically disposed cylindrical tube 168 and abut the end surface of the stop 164. The retainer pin 170 includes a flat partially circular head 172, larger in diameter than the pin 170 that is adapted to engage the top edge of cylindrical tube 168 to prevent the pin 170 from dropping through the tube 168 and maintaining the bracket pin 140 in place.

The bracket assembly 100 of the present invention provides increased overturning strength of the assembly and permits a more even distribution of the load during overturning and stresses on the bracket assembly. In a typical installation, the frame 112 is attached to the main chassis or frame of the truck by bolting the frame to the chassis. The frame 112 may be additionally secured to the truck by providing bolts through the rails 118. The base plate 108, which has the retainer assemblies 130 secured thereto, is positioned in the channels 120 formed by rails 118 and slid to an appropriate position on the truck frame and secured thereto as by bolts extending through openings 110. The position of the base plate 108 and lower bracket assembly 104 on the truck frame is determined in a manner well known in the art based on a variety of factors including the type of trailer, the type of truck, and the load to be attached to the truck. Once the base plate 108 is secured to the truck frame at its desired location, a reinforced bushing 144 is inserted into each of the hollow cylindrical tubes 136 so that the front face of the rubber bushing butts up against the support plate 132A. The bushing 144 should fit snugly in the tube. The rubber bushing 144 is generally sized so that it will remain seated in the hollow cylindrical tube 136 and form an interference fit within the hollow tube 136. The rubber bushing may be integrally reinforced or reinforced with a steel washer of the identical diameter positioned adjacent the bushing in the tube 136 as described above.

The top plate 102 or fifth wheel is then placed over the lower bracket assembly 104 and the retainer assemblies 130 so that a portion of the depending skirt 152 is positioned generally parallel to and outwardly adjacent from the support plate 132A as illustrated in FIGS. 1, 2, and 4. In addition, the downwardly depending flange portion 156 of the flat plate 148 is positioned generally parallel to and inwardly adjacent the support plate 132B and the rim 142 of the tube 136. The top surface of the hollow cylindrical tube 136 then fits within the saddle 154 of the top plate 102 providing contact between the saddle bearing surface 158 of the top plate and the tube 136 of the retainer assembly 130. The openings 160, 162 through the skirt portion 152 and the downwardly depending flange portion 156 of the top plate 102 should be coaxially aligned with opening 138 through the support plate 132A and the longitudinal axis of the hollow cylindrical tube 136.

Bracket pin 140 is then inserted through the opening 160 in the depending skirt portion, the opening 138 in the first upright plate, the bushing 144, the opening formed by the tube support 136, and the opening 162 in the downwardly depending flange portion 156 of the top plate 102. When the bushing is reinforced by an adjacently positioned steel washer, the pin 140 would also extend through the steel washer as illustrated in FIG. 4. The bracket pin 140 is inserted until the stop 164, secured to the rearward end of the pin 140, engages the skirt portion 152 of the top plate. A retainer pin 170 is then inserted through the vertically disposed hollow tube 168 until it engages the stop 164 connected to the pin 140 to prevent the bracket pin 140 from backing out of the bracket assembly 100. The top plate 102 is thus securely attached to the lower bracket assembly 104 and permitted to rock or rotate about the axis defined by the bracket pin 140. It should be understood that two bracket pins 140 are utilized in securing the top plate 102 to the lower bracket assembly 104—one for each retainer assembly 130.

One of the advantages apparent from the present invention is that the use of the reinforced rubber bushing assists in distributing the shearing forces on the bracket pin 140 when a load is applied to the bracket assembly. This arrangement thus provides greater overturning strength of the bracket assembly.

It is also intended that the reinforced bushing 144 of the present invention may be added to existing bracket assemblies to provide the benefit of greater overturning strengths and the re-distribution of shearing forces.

During movement of the tractor-trailer assembly, there is a tendency for the top plate, which connect the tractor and trailer, to lift upwardly away from the lower bracket assembly. When this occurs a force is applied normally to the longitudinal axis of the pin 140 at points where the radial movement of the pin 140 is restricted, such as by the annular surface of openings 138 of support plate 132A. By including a steel washer adjacent the bushing or an integrally reinforced bushing, a portion of the load or shearing force is acting on the pin 140 at one point effectively distributed to another portion of the pin thereby reducing the concentration of the shearing force at any one portion along the pin 140. Consequently, the overall strength of the bracket is increased. In addition, the rubber bushing assists in dampening the vibrations that occur between the top plate and the lower bracket assembly.

The present invention incorporating the reinforced rubber bushing also more evenly distributes the load during overturning such as when the trailer pivots relative to the truck. During this type of motion, there is a tendency for the top plate 102 to tilt and raise up at one or the other of the retainer assemblies 130. The present invention assists in distributing the load.

In view of the description above, it is evident that the present invention provides a new and unique bracket for attaching a top plate of a fifth wheel to the tractor or truck. Although reference has been made to the use of the present invention, it will also be apparent to those skilled in the art that various modifications and variations can be made in the design and construction of the bracket assembly without departing from the scope or spirit of the invention.

Other embodiments of the invention will be apparent to those skilled in the art from consideration of the specification and practice of the invention disclosed herein. It is intended that specification and examples be considered as exemplary only, with the true scope and spirit of the invention being indicated by the following claims.

What is claimed is:

1. A bracket assembly for connecting a fifth wheel to a truck comprising:

a base adapted to be secured to the rearward end of a truck;

a pair of spaced apart retainer assemblies connected to said base and disposed adjacent opposite edges of said base, each of said retainer assemblies including spaced apart upright support plates disposed substantially perpendicular to said base, one of said plates having a pin receiving opening therethrough, and a cylindrical tube portion coaxial with said pin receiving opening and connected to said support plates; and a radially reinforced bushing seated in said cylindrical tube portion, said bushing having an elastomeric cylindrical body of a pre-determined outer diameter having a bore through the longitudinal axis of the body, said bore having a first diameter and coaxial with said pin receiving opening, and a generally rigid annular member of said predetermined outer diameter coaxial with said body, said annular member having an opening of a second diameter larger than said first diameter.

2. The bracket assembly of claim 1 further comprising a sub-base, said sub-base including a pair of spaced apart elongated brackets positioned longitudinally on said truck, each of said elongated brackets including a raised rail portion defining a channel adapted to receive said base.

3. The bracket assembly of claim 2 wherein said reinforced bushing includes an adjacently positioned steel washer having an opening therethrough substantially coaxial with and similarly sized as said pin receiving opening.

4. The bracket assembly of claim 2 where in said base includes upright anti-rocker plates positioned forwardly of each of said retainer assemblies.

5. The bracket assembly of claim 2 wherein said spaced apart plates include a first plate positioned adjacent said edge of said base and a second plate positioned inwardly from said edge.

6. The bracket assembly of claim 2 wherein said base includes a plurality of openings adapted to receive a bolt for securing said base to said truck.

7. The bracket assembly of claim 1 wherein said reinforced bushing includes an adjacently positioned steel washer having an opening therethrough substantially coaxial with and similarly sized as said pin receiving opening.

8. The bracket assembly of claim 1 where in said base includes upright anti-rocker plates positioned forwardly of each of said retainer assemblies.

9. The bracket assembly of claim 1 wherein said spaced apart upright plates include a first plate positioned adjacent said edge of said base and a second plate positioned inwardly from said edge.

10. The bracket assembly of claim 1 wherein said base includes a plurality of openings adapted to receive a bolt for securing said base to said truck.

11. A bracket assembly for connecting a trailer to a truck said bracket assembly comprising:

a base adapted to be secured on the rearward end of a truck;

a pair of spaced apart retainer assemblies connected to said base and disposed adjacent opposite edges of said base, said retainer assemblies including spaced apart upright support plates disposed substantially perpendicular to said base, one of said plates including a pin receiving opening, a hollow cylindrical portion substantially coaxial with said pin receiving opening connected to said support plates;

a radially reinforced bushing seated in said cylindrical portion, said bushing having an elastomeric cylindrical body of a pre-determined outer diameter having a bore through the longitudinal axis of the body, said bore having a first diameter, a generally rigid annular member of said pre-determined outer diameter integral and coaxial with said body, said annular member having an opening of a second diameter larger than said first diameter;

a top plate adapted to receive and secure the king pin of a trailer disposed over said pair of retainer assemblies, said top plate including a peripheral downwardly depending skirt, portions of said skirt disposed substantially parallel to and outwardly adjacent from said support plates, said portions of said skirt each including an aperture therethrough; and a pair of attachment pins each adapted to extend successively through said aperture in said portions of said skirt, the pin receiving opening and said reinforced bushing.

12. The bracket assembly of claim 11 further comprising a sub-base, said sub-base including a pair of spaced apart elongated brackets positioned longitudinally on said truck, each of said elongated brackets including a raised rail portion defining a channel adapted to receive said base.

13. The bracket assembly of claim 12 wherein said reinforced bushing includes an adjacently positioned steel washer having an opening therethrough substantially coaxial with and similarly sized as said pin receiving opening.

14. The bracket assembly of claim 11 wherein said reinforced bushing includes an adjacently positioned steel washer having an opening therethrough substantially coaxial with and similarly sized as said pin receiving opening.

15. The bracket assembly of claim 11 where in said base includes upright anti-rocker plates positioned forwardly of each of said retainer assemblies.

16. The bracket assembly of claim 11 wherein said spaced apart upright plates include a first plate positioned adjacent said edge of said base and a second plate positioned inwardly from said edge.

17. The bracket assembly of claim 11 wherein said base includes a plurality of openings adapted to receive a bolt for securing said base to said truck.

18. A bracket assembly for connecting a trailer to a truck, said bracket assembly comprising:

a base adapted to be secured on the rearward end of a truck;

a pair of spaced apart retainer assemblies connected to said base and disposed adjacent opposite edges of said base, said retainer assemblies including spaced apart upright support plates disposed substantially perpendicular to said base, one of said support plates including a pin receiving opening, and a hollow cylindrical tube portion substantially coaxial with said pin receiving opening and connected to said support plates;

a radially reinforced bushing seated in said cylindrical tube, said bushing having an elastomeric cylindrical body of a pre-determined outer diameter having a bore through the longitudinal axis of the body, said bore having a first diameter, and a generally rigid annular member of said pre-determined outer diameter integral and coaxial with said body, said annular member having an opening of a second diameter larger than said first diameter;

a top plate adapted to receive and secure the king pin of a trailer, said top plate disposed over said retainer assemblies and including a peripheral downwardly depending skirt and a downwardly depending flange which cooperates with a portion of said skirt to form a saddle adapted to engage the cylindrical tube portion of said retainer assemblies, said portions of said skirt are disposed parallel to and outwardly adjacent from said support plates and including an aperture therethrough coaxial with said pin receiving opening and a second aperture through said flange;

a pair of attachment pins each adapted to extend successively through said aperture in said portion of said skirt, said pin receiving opening, said reinforced bushing and said second aperture in said flange.

19. The bracket assembly of claim 18 wherein said downwardly depending flange is disposed inwardly from said support plates when said top plate is disposed over said retainer assemblies.

20. The bracket assembly of claim 18 further including locking pins for preventing removal of said pair of attachment pins.

21. The bracket assembly of claim 18 wherein said saddle includes an arcuate bearing surface.

22. The bracket assembly of claim 18 further comprising a sub-base, said sub-base including a pair of spaced apart elongated brackets positioned longitudinally on said truck, each of said elongated brackets including a raised rail portion defining a channel adapted to receive said base.

23. The bracket assembly of claim 22 wherein said reinforced bushing includes an adjacently positioned steel washer having an opening therethrough substantially coaxial with and similarly sized as said pin receiving opening.

24. The bracket assembly of claim 18 wherein said reinforced bushing includes an adjacently positioned steel washer having an opening therethrough substantially coaxial with and similarly sized as said pin receiving opening.

25. The bracket assembly of claim 18 where in said base includes upright anti-rocker plates positioned forwardly of each of said retainer assemblies.

26. The bracket assembly of claim 18 wherein said spaced apart upright plates include a first plate positioned adjacent said edge of said base and a second plate positioned inwardly from said edge.

27. The bracket assembly of claim 18 wherein said base includes a plurality of openings adapted to receive a bolt for securing said base to said truck.

28. A reinforced bushing for use with a bracket assembly attaching a truck to a trailer, said bushing comprising:

an elastomeric cylindrical body of a pre-determined outer diameter having a bore through the longitudinal axis of the body, said bore having a first diameter;

a generally rigid annular member of said pre-determined outer diameter integral and coaxial with said body, said annular member having an opening of a second diameter larger than said first diameter.

* * * * *